Oct. 5, 1965 L. O. UPTON 3,209,641
INFRA-RED TRANSMITTING FIBERS FORMED OF ARSENIC AND SULPHUR
Filed Feb. 15, 1960 4 Sheets-Sheet 1

INVENTOR
LEE O. UPTON
BY Louis L. Gagnon
ATTORNEY

Oct. 5, 1965 L. O. UPTON 3,209,641
INFRA-RED TRANSMITTING FIBERS FORMED OF ARSENIC AND SULPHUR
Filed Feb. 15, 1960 4 Sheets-Sheet 3

INVENTOR
LEE O. UPTON
BY
*Louis L. Gagnon*
ATTORNEY

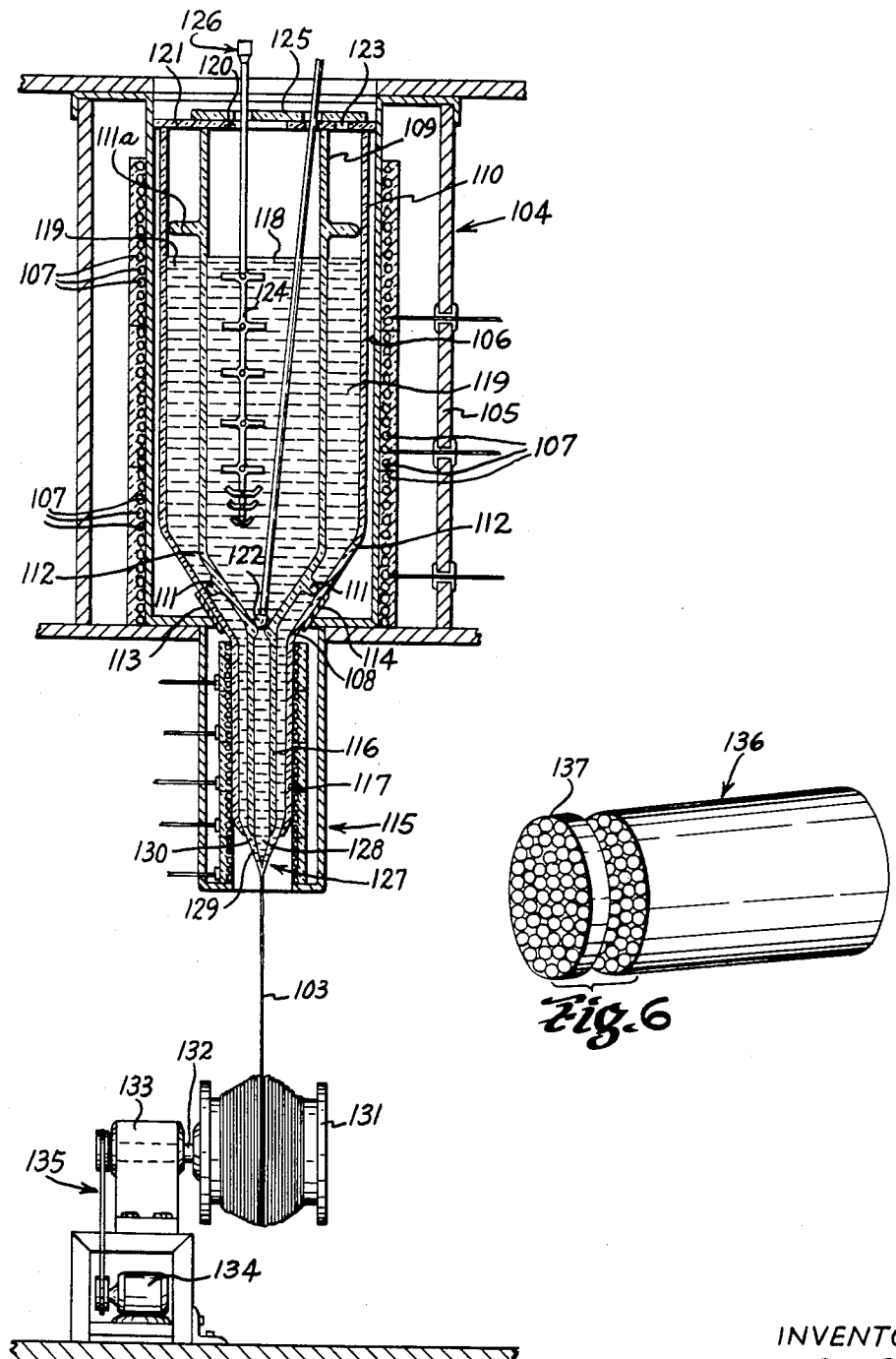

3,209,641
INFRA-RED TRANSMITTING FIBERS FORMED OF ARSENIC AND SULPHUR
Lee O. Upton, Sturbridge, Mass., assignor to American Optical Company, Southbridge, Mass., a voluntary association of Massachusetts
Filed Feb. 15, 1960, Ser. No. 8,655
3 Claims. (Cl. 88—1)

This invention relates to improvements in glass fiber-type conducting elements and means and method of making the same and has particular reference to novel apparatus and method of making fibers from glasses which are fabricated by vaporization of ingredients and subsequent condensation of the vaporization product.

Single-component glasses such as sulphides, selenides and tellurides or combinations thereof having high infra-red transmitting properties have been found to be more satisfactorily fabricated by distillation processes mainly for the reason that, by such processes, glasses of the above type can be produced more efficiently and economically with a high degree of purity and optical perfection from cheap raw materials. However, the forming of finished optical products from condensates of glass distillation processes has involved tedious, time-consuming and expensive operations involving various remelting, annealing, grinding, polishing, cutting and/or shaping steps which are more or less complicated by the intricacy of the product being formed.

The present invention, which relates more specifically to the forming of intricate and high quality conducting elements of fiber size from glasses of the above character, has for its principal object the provision of improved glass fibers having high infra-red transmitting properties and novel means and method of efficiently and economically making the same.

Another object of the invention is to provide novel method and apparatus for making infra-red transmitting glass fibers of sulphide, selenide or telluride glasses or glasses embodying combinations of arsenic, sulphur, selenium and tellurium such as, for example, arsenic trisulphide, arsenic sulphide, arsenic selenide or arsenic telluride which are the more stable single-component glasses in the order given.

Another object is to provide improved means and method of making light-transmitting fibers of the above character directly from a condensate of glass formed by the distillation of the glass ingredients without requiring remelting or reworking of said condensate.

Another object is to provide novel means and method of repeatedly producing light-conducting fibers of the above character which are substantially uniform as to physical, chemical and optical properties.

Another object is to provide means and method of making infra-red light-conducting fibers with or without individual light-insulating outer claddings, as desired.

Still another object is to provide novel means and method of cladding a glass fiber of the above character with a material having a lower index of refraction than that of the material of said fiber.

A further object is to provide a highly efficient infra-red transmitting fiber having a core section formed of glass of a preselected index of refraction with an outer surrounding insulating cladding of a different type of glass having a lower index of refraction than that of said core section and means and method of making the same directly from the distillation products of preselected glass ingredients.

A still further object is to provide a unique arrangement of glass distillation and fiber-drawing equipment by means of which fibers of exceptionally pure and high quality distilled optical glasses can be mass produced without requiring highly skilled labor.

Other objects and advantages of the invention will become apparent from the following description when taken in conjunction with the accompanying drawings in which:

FIG. 4 is a diagrammatic vertical cross-sectional view of a further modification of the invention;

FIG. 6 diagrammatically illustrates the making of a fiber optical device from light-conducting fibers of the above character.

Figure 1:
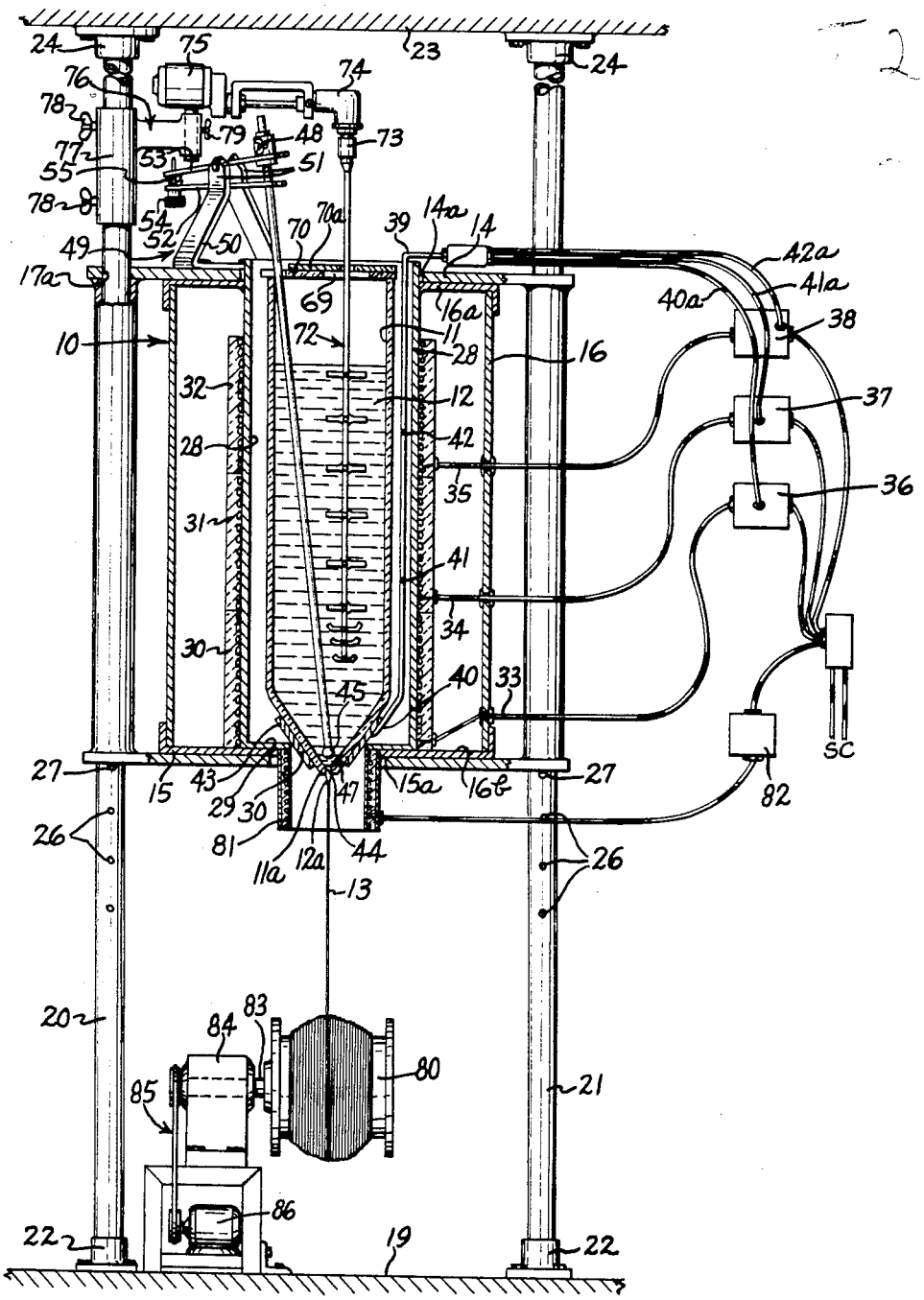
FIG. 1 is a diagrammatic elevational view, shown partially in cross-section, of a preferred form of apparatus for carrying out the method of the invention.

Referring more particularly to the drawings wherein like characters of reference designate like parts throughout the various views, apparatus embodying a preferred form of the invention comprises a glass-condensing unit 10 (see FIGS. 1 and 2) having an elongated glass-condensing tube 11 disposed longitudinally and substantially centrally therein for receiving and supporting a supply of distilled glass 12 from which a glass fiber 13 is subsequently drawn, as will be described in detail hereinafter.

The unit 10 further embodies a main supporting structure consisting of rigid upper and lower transversely extending plates 14 and 15 respectively between which an enlarged tubular housing 16 of metal such as steel or the like having end covers 16a and 16b extends and is attached at each of its opposite ends by weld connections or suitable bolts or the like to the respective plates 14 and 15. The plates 14 and 15 are additionally rigidly supported in fixed spaced relation with each other by diametrically opposed metallic tubular sleeve-like members 17 and 18 extending endwise between the plates 14 and 15 outwardly of the housing 16 at opposite sides thereof. The sleeve-like members are securely welded or otherwise connected at their opposite ends to the respective plates 14 and 15, as shown, and circular openings 17a are provided through the plates 14 and 15 in coaxial relation with each of the opposite ends of the sleeve-like members 17 and 18 to provide a clear passageway through the plates 14 and 15 and the inner area of the members 17 and 18, the passageways each being of a diameter substantially equal to that of the inner diameter of said sleeve-like parts 17 and 18.

When in use, the condensing unit 10 is suspended a predetermined distance above the floor 19 of a room in which it is to be used by means of a pair of parallel vertical columns 20 and 21 which pass through the sleeve-like members 17 and 18 respectively, and the above-mentioned openings in the plates 14 and 15. The columns 20 and 21 are bolted or otherwise secured to the floor 19 with suitable fittings 22 and are likewise attached to the ceiling 23 of the room with similar fittings 24. It should be understood that the entire structure could be rendered independently movable on the floor 19, if desired, by connecting the fittings 22 to a suitable enlarged base plate, not shown, and further providing frame-like supporting means extending from the base plate to the upper fittings 24 for permanently holding the columns 20 and 21 in vertically parallel relation with each other.

The columns 20 and 21 are of a preselected outer diameter such as to produce a relatively close sliding fit through the sleeve-like members 17 and 18 and thereby permit vertical adjustment of the unit 10 along the columns 20 and 21. A series of vertically spaced holes 26 are provided diametrically through the columns 20 and 21 at various preselected levels above the floor 19 through which pins such as 27 are inserted, as shown, to hold the unit 10 on the columns 20 and 21 at a preselected height above the floor 19. Any suitable conventional hoisting or jacking means may be provided to raise or lower the unit 10 as desired.

Within the tubular housing 16 and in relatively close surrounding relation with the condensing tube 11, there is provided a tubular muffle 28 of a suitable high melting point metal which is aligned in substantially coaxial relation with the tubular housing 16 and rigidly secured in place at its opposite ends to the upper and lower end covers 16a and 16b thereof by weld connections or with bolts, if desired. The uppermost open end of the tubular muffle 28 protrudes upwardly slightly through the end cover 16a and an opening 14a in the upper supporting plate 14, as shown in FIG. 1. Its lowermost partially closed end 29 is provided with a substantially coaxial opening therethrough of pre-controlled size such as to support the depending end 11a of the condensing tube 11 as will be presently described. It will be noted that the plate 15 is provided with an enlarged opening 15a permitting the depending end of the condensing tube to extend downwardly therethrough.

Encircling the outermost sides of the muffle 28, there are provided electrical heating elements 30, 31 and 32 in super-imposed end-to-end relation with each other, as shown, and each having electrical connections 33, 34 and 35 respectively, connecting the same to a suitable source of electrical energy through individual conventional heat-controlling pyrometers or the like 36, 37 and 38 which have been shown by block diagram for purposes of illustration.

Individual control of the intensity of the heat produced by each of the elements 30, 31 and 32 is accomplished by means of an elongated sheath-like thermocouple protection tube 39 which extends downwardly between the muffle 28 and the glass condensing tube 11 throughout the entire length of the muffle 28. Within the thermocouple tube 39, there are provided three conventional thermocouples having their heat-detecting ends each terminating at a location adjacent the particular heating element to be controlled thereby. For example, the thermocouple which is to sense the heat produced by the element 30 is placed so as to have its heat-detecting end located within the tube 39 at approximately the point indicated by reference numeral 40 and is electrically connected individually to the control unit 36 by the leads 40a. Similarly, the heat-detecting end of the thermocouple which is to sense the heat produced by the element 31 is located at approximately the point indicated by the reference numeral 41 and is individually electrically connected to the control unit 37 by the lead 41a and the thermocouple to sense the heat produced by the element 32 is located approximately at 42 and is individually electrically connected to the control unit 38 by the lead 42a.

With the above arrangement, it can be seen that the viscosity of the distilled glass 12 can be readily accurately controlled through its entire volume in the tube 11 by the simultaneous individual operation of the heating elements 30, 31 and 32.

The condensing tube 11 is formed of fused quartz or the like to resist chemical attack by the glass 12 and thus avoid contamination thereof when single-component glasses of sulphide, selenide, telluride or combinations thereof are condensed or placed therein to ultimately form the fiber 13. It is well-known that such glasses will attack other materials such as platinum which would be used if the glasses were of the oxide type.

The condensing tube 11 is provided with a conically-shaped depending end section 11a having a similarly tapered conical metallic sleeve 43 of sheet steel or the like fitted around the major portion of said end section 11a to provide bearing means for engaging the peripheral edge portions of the opening 30 in the end cover 16b when the condensing tube 11 is placed within the muffle 28, as shown. It will be noted that the condensing tube 11 is simply lowered into the muffle 28 to the point where the conical sleeve engages substantially the entire periphery of the opening 30 thereby centering the end 11a of the tube 11 in said opening 30. The tube is otherwise unsupported and loosely fitted in the muffle 28, as illustrated. The end section 11a may be spherical in shape, if desired. A glass exit orifice 44 in the form of a drilled hole through the terminal end of the condensing tube is provided to permit discharging the glass 12 from which the fiber 13 is subsequently drawn in a manner to be described in detail hereinafter and a stopper 45 also formed of fused quartz is provided to close off the orifice 44 when the tube 11 is being filled with the condensed glass 12 prior to a fiber-drawing operation. The stopper 45 which is spherical in shape is formed as an integral end part of an elongated fused quartz rod 46 which extends upwardly and outwardly through an opening in the upper end of the tube 11, as illustrated. A cylindrical socket 47 of substantially the same radius of curvature as that of the stopper 45 is ground into the condensing tube 11 at the inner end of the orifice 44 to intimately receive the stopper 45 when it is lowered thereinto and, in this way, close off the exit orifice.

In order to raise or lower the stopper 45, as desired, a fitting 48 is clamped to the rod 46 adjacent its uppermost end and the fitting 48 is, in turn, supported in an actuating mechanism 49. The mechanism 49 embodies an upstanding supporting section 50 bolted or otherwise secured to the plate 14. The section 50 is provided with a pair of upwardly directed parallel ear-like sections 51 between which an elongated plate-like member 52 extends laterally or substantially parallel to the plate 14 of the condensing unit 10. The member 52 is welded or otherwise rigidly attached to the sections 51 and a similarly shaped plate-like member 53 is pivotally mounted between the upper terminal ends of the sections 51. Both of the plate-like members 52 and 53 are bifurcated at their ends nearest the condensing tube 11 and the rod 46 passes loosely through the bifurcation of the plate-like member 52 to be held in the bifurcation of the member 53 by a pivotable yoke-like connection with the fitting 48. Across the open end of the bifurcation of plate 52 there is provided a pin member to prevent horizontal and vertical displacement of the rod 46 which might result in accidental opening of the orifice 44. At the opposite ends of the members 52 and 53, there is provided an adjustable thumb screw 54 which extends loosely through a suitable opening in the member 52 and is threaded through an opening in the member 53. Thus, by rotation of the screw 54 in one direction, the member 53 will be drawn toward the member 52 at their ends adjacent the screw 54 causing the member 53 to pivot at its connection with the supporting sections 51 and lift its bifurcated end to raise the rod and stopper 45 allowing the glass 12 to flow through the orifice 44. Rotation of the screw in the opposite direction will then permit the rod 46 to lower under its own weight by pivoting the member 53 downwardly at its bifurcated end. However, because the differences in specific gravity or density of the material of the rod 46 and the glass 12 might be such as to produce a buoyant effect on the rod 46 and prevent a secure closing of the stopper 45, a compression spring 55 is placed around the portion of the screw 54 between the members 52 and 53 to assure a secure closing of the orifice 44 without causing excessive downward pressure on the orifice closure seat when the screw 54 is loosened by turning in the proper direction.

Prior to each fiber-drawing operation, the condensing tube 11 is filled to a predetermined level with glass 12 from which the fiber 13 is subsequently drawn. With the stopper 45 positioned to close off the orifice 44, the filling of the tube 11 is accomplished through its uppermost open end where the vaporization product of distilled glass ingredients is inserted, as shown in FIG. 2.

Figure 2:
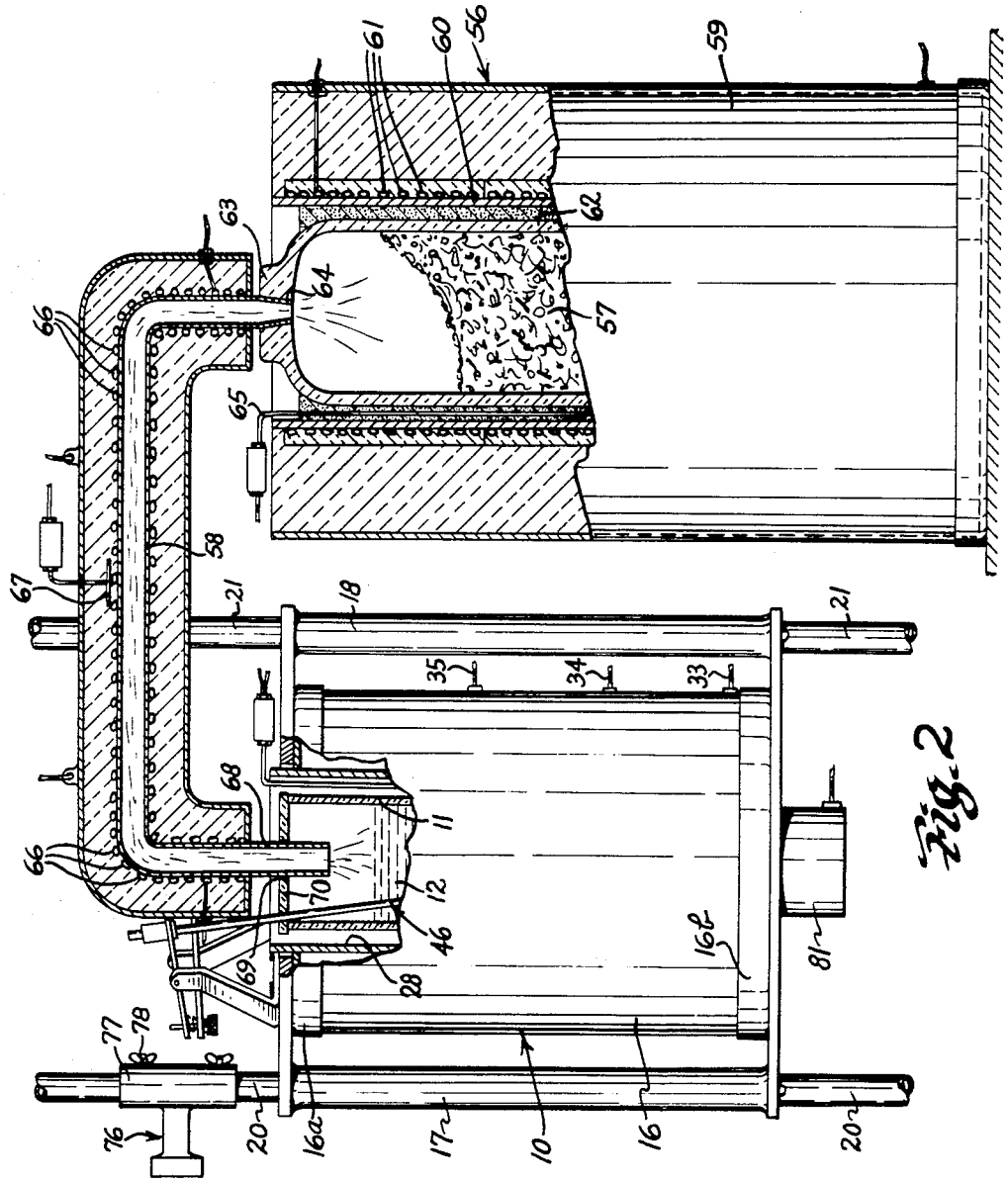
FIG. 2 is a view similar to FIG. 1 illustrating additional apparatus for carrying out an initial glass making step in the process of the invention.

It is pointed out that while glasses other than those formed by a distillation process may be simply poured or otherwise flowed into the tube 11 and subsequently drawn to fiber size as will be described, this invention relates more particularly to the forming of high infra-red transmitting fibers by distillation of the ingredients of sulphide, selenide or telluride glasses or the like, and the forming of a fiber directly from the condensate of the distillation process. Condensation of the vaporization product to form the glass 12 is accomplished directly in the tube 11 as follows:

Referring more particularly to FIG. 2, it will be seen that adjacent the condensing unit 10, there is provided a distillation unit 56 in which glass ingredients 57 are vaporized and transferred via a transfer tube 58 of fused quartz or the like into the condensing tube 11.

The distillation unit 56 comprises an upright tubular metal housing 59 of steel or the like which has suspended therein a hollow cylindrical metallic muffle 60 of steel or the like having heating coils 61 therearound. Enclosing the sides and bottom of the muffle 60 is a supply of insulating material such as alumina or the like to insulate the housing 59 from a substantial amount of the heat produced by the coils 61. The heating coils are connected to a suitable source of electrical energy in a manner similar to that described above with relation to the heating coils of the condensing unit 10. Supported within the muffle 60 by means of a relatively thin layer of alumina or other similar granular refractory material is a hollow distillation tube 62 which is formed of fused quartz or the like and which contains a supply of the glass ingredients 57 either as raw material or cullet or combinations of both which are to be converted into the resultant glass 12 in the condensing unit 10. The upper end of the distillation tube 62 is provided with a neck 63 having an opening 64 therein which is adapted to intimately receive one end of the transfer tube 58. Thus, when a precontrolled heat from the coils 61 is applied to the glass ingredients 57, the ingredients will melt and vaporize and the vaporization product will pass outwardly of the distillation tube into and through the transfer tube 58 to the condensing tube 11 of the unit 10. A thermocouple arrangement 65 is placed adjacent the distillation tube to provide proper temperature control for the vaporizing process.

It will also be noted that the transfer tube 58 is provided with surrounding heating coils suitably connected to an electrical current supply and thermostatically controlled by a thermocouple or the like 67 to maintain heat in the transfer tube 58 of a high enough temperature to prevent condensation of the glass vapors passing therethrough. The transfer tube 58 is also covered throughout the major portion of its length with insulation to prevent loss of heat and thus provide a more efficient transfer of the vaporization product. The end 68 of the transfer tube 58 is inserted through an opening 69 in a cover 70 of high melting glass or other suitable material on the condensating tube 11 which cover is provided to prevent excessive combustion of the vaporization gases entering the tube 11. By proper control of the temperatures within the condensing tube 11, the vapor passing thereinto will collect, in condensed form, on the walls of the tube 11 and thus form the glass supply 12 within the tube 11.

In making arsenic trisulphide glass, for example, the proper related proportions, well-known to the glass making industry, of raw arsenic and sulphur with a cullet of crushed raw arsenic trisulphide glass synthesized by previously melting the rough stoichiometric proportions of arsenic metal and sulphur are placed in the distillation tube 62 for processing by boiling to form the above-decribed vapor. By gradually increasing the temperature of the glass formed by the reaction between the ingredients 57 as it is vaporized, a relatively constant pressure can be maintained within the distillation tube to continually force the glass vapors through the transfer tube into the condensing tube 11.

Reference is made to applicant's Patent #2,804,387 issued August 27, 1957, for more detailed information as to equipment and procedure used to form glasses by distillation. It is pointed out, however, that the use of nitrogen or other non-oxidizing atmospheres as called for in the above-mentioned patent are not essential to the presently described method of producing the glass 12. Also, with the present process no annealing of the glass condensates is required. Otherwise, the temperatures of distillation and condensation and process steps of Patent #2,804,387 will serve as examples of those essential to the glass-making procedures of the present case.

After having exhausted the supply of glass vapor from the distillation unit 56, the transfer tube 58 is removed from the condensing unit 10 preferably by means of a suitable hoisting mechanism, not shown, and a stirring rod 72 formed of fused quartz is inserted into the molten glass 12 after which a second apertured glass cover 70a is fitted over the stirring rod 72 to close the major portion of the opening 69 and thus prevent excessive escape of vapors within the condensing tube 11.

The stirring rod 72 is clamped in a rotatable chuck 73, as shown in FIG. 1. The chuck 73 is operated to rotate the stirring rod 72 by means of a right-angled gear drive 74 which is driven by an electric motor 75 and the motor 75 which supports the gear drive, chuck and stirring rod assembly is mounted on a supporting bracket 76 having a tubular section 77 slidably mounted on the column 20. Alignment of the stirring rod 72 to place it properly in the condensing tube to one side of the rod 46, as shown, is accomplished by raising or lowering and/or rotation of the bracket 76 on the column 20. When properly adjusted, the bracket 76 is secured to the column 20 by set screws 78. To render the adjustment of the stirring apparatus still more universal, the motor 75 is also pivotally mounted on the bracket 76, as shown, and held with a set screw 79.

With the stirring rod 72 in continuous operation, a substantially complete homogenization of the molten glass 12 is produced and the fiber 13 is drawn by lifting the stopper 45 whereupon the glass 12 flowing through the orifice 44 will form a gob-like section 12a which depends from the tube 11. From this section 12a of glass, the fiber 13 is formed by initially gripping the glass at 12a with tongs or the like and pulling it at a controlled speed in a downward direction. The fiber 13 thus produced, is taped or otherwise attached to a rotating drum or mandrel 80 to continue the drawing at a controlled rate.

The ultimate cross-sectional size of the fiber 13 is dependent upon the viscosity of the glass at the section 12a thereof and the rate at which it is drawn. To provide the section 12a of glass with a uniform precontrolled temperature, a cylindrical electrical heating unit 81 is provided to surround the depending end of the condensing tube 11, as shown in FIG. 1, and a uniform controlled heat is produced around the section 12a of the glass by means of suitable conventional electrical control means 82 preferably in the form of a variable transformer or the like which, in turn, is connected to a suitable source of current.

As an example, with a glass exit orifice 44 of approximately 3/16" in diameter, a fiber 13 of approximately .002" in diameter can be formed of arsenic trisulphide glass by drawing the fiber at a rate of approximately 150 feet/minute while maintaining a temperature of approximately 550° C. around the condensing tube 11 adjacent the levels indicated by the reference numerals 41 and 42 and a temperature of approximately 450° C. around the tube 11 adjacent the level indicated by the reference numeral 40 while further simultaneously maintaining a temperature of from 250° C. to 300° C. around the section 12a of glass by means of the heating element 81.

The mandrel 80 which is of a preselected outer diameter in accordance with the speed of drawing desired is mounted for rotation on a shaft 83 which is journalled in a bearing support 84 and driven with a belt and pulley arrangement 85 by a motor 86. It should be understood, however, that any other conventional drive means for rotating the mandrel 80 may replace the arrangement just described.

Figure 5:
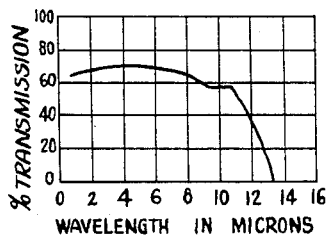
FIG. 5 is a chart generally indicating the light-transmission characteristics of certain glasses from which fibers may be formed in accordance with the invention.

With the above-described process, a fiber 13 of practically any desired size and formed of sulphide, selenide or telluride glasses or combinations thereof possessing transmission characteristics such as illustrated graphically in FIG. 5 can be produced efficiently and economically. Furthermore, it is pointed out that the fiber 13 is formed directly from the condensate of the glass resulting from the reaction between the ingredients of the previously recited materials without in any way reworking said condensate before drawing the fiber.

Radiation entering one end of a fiber, such as 13, will be transferred through the fiber and particularly in view of the high infra-red transmitting properties of such fibers (see FIG. 5), their use in special adaptations of light-conducting devices is invaluable. It is pointed out that all reference to the term "light" which is made in this specification is intended to include all radiation at least within the limits of the optical region (approximately 0.2 microns–13 microns) of the electromagnetic spectrum. Thus, the infra-red and ultra-violet, as well as the visible portions of the spectrum, are included.

If a group of fibers such as 13 is gathered together in side-by-side relation with each other so as to be within a distance of approximately a half wavelength of light of each other, some light will leak from one fiber to another and if the fibers are sufficiently small, this leakage may present a serious problem. In view of this fact, it has been advisable to light-insulate the fibers from one another by providing on each fiber a relatively thin jacket or cladding of material whose index of refraction is lower than that of the fiber. This cladding also serves to protect the wall of the fiber where internal reflection takes place, keeping it clean and smooth.

Figure 3:
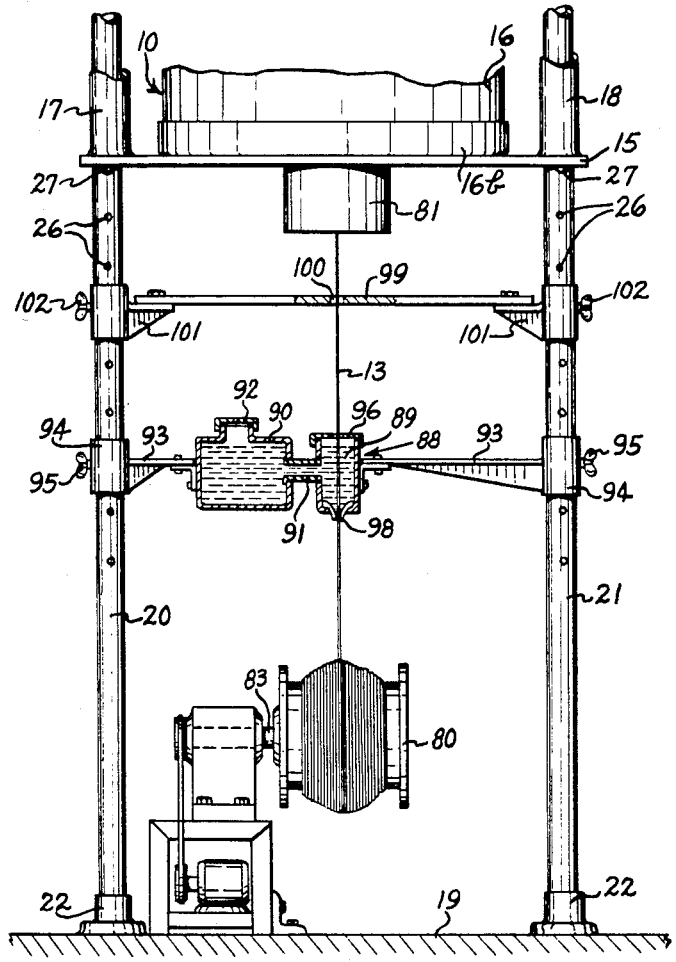
FIG. 3 is a fragmentary elevational view shown partially in cross-section of a modification of the apparatus shown in FIG. 1.

In FIG. 3, there is shown a modification of the apparatus of FIG. 1 by means of which a cladding of material lower in index of refraction than that of the fiber is applied to the fiber 13. The fiber cladding apparatus of FIG. 3 embodies a tubular container 88 through which the fiber 13 is drawn longitudinally before being wound on the mandrel 80. Within the container 88, there is provided a fiber cladding medium 89 such as, for example, a mixture of tetraethylortho-silicate having microscopic particles of silica therein which is of a lower index of refraction than that of the material of the fiber 13 itself. The cladding medium 18 may be formed by using ethyl silicate and suspended silica particles in a solution of hydrochloric acid and ethyl alcohol and, when dried after application to the fiber 13, it will form a uniform layer which is very thin and firmly adhered thereto and which will be fairly inert to chemical attack. The cladding medium may be varied as different uses require and easily altered by control of the solvents of the solution to be rendered quick-drying and of practically any desired thickness on the fiber. This may be accomplished by controlling the viscosity of mixture, the speed of travel of the fiber therethrough and the drying characteristics of the mixture.

The container 88 is maintained substantially full of the coating solution by means of a reservoir 90 and an interconnecting passageway 91. The reservoir 90 is filled by removal of the vented cover 92 and the entire apparatus is suspended from the column 20 and 21 by means of brackets 93 and collars 94 which are slidably adjustable along the said columns. When at a desired level above the mandrel 80, the collars 94 are clamped to the columns 20 and 21 by set screws 95. The uppermost end of the container 88 is provided with a cover 96 having a central opening 97 through which the fiber is passed as shown. The cover 96 prevents contamination of the cladding medium 88 by dust or the like and also prevents excessive evaporation of the liquid vehicle in which the cladding materials are suspended.

At the depending end of the container 88, there is provided a wiper 98 of felt or sponge rubber or the like through which the fiber 13 is drawn and which acts to prevent a free flow of the medium 89 outwardly of the container 88 and, further, assures a uniform coating of the fiber 13 as it passes therethrough. In order to prevent overheating of the cladding material by heat-radiation from the glass condensing unit 10, and, particularly, the heating coils 81 thereof, a heat shield 99 of heat-reflecting material such as aluminum or the like is placed between the cladding arrangement and the condensing unit 10. The heat shield 99 is provided with an opening 100 through which the fiber 13 is passed and supporting brackets 101 slidably adjustable on the columns 20 and 21 are provided to support the heat shield 99. When in a desired adjusted position on the columns 20 and 21, the set screws 102 are tightened to hold the heat shield 99 permanently in place.

A further modification of the invention (see FIG. 4) provides for the forming of a glass clad glass fiber 103 having a core section of a distilled glass of relatively high index of refraction and an outer relatively thin cladding of another distilled glass having a lower index of refraction. As an example, a core glass containing approximately 60% of arsenic and 40% of sulphur ($As_2S_3$) and a cladding glass containing approximately 50% of arsenic and 50% sulphur can be employed for this purpose.

Being basically similar to the apparatus of FIGS. 1 and 2, the device of FIG. 4 embodies a condensing unit generally indicated as 104 having, in this case, an outer tubular metal housing 105 of steel or the like and an inner tubular muffle 106 with electrical heating coils 107 wrapped therearound. Within the muffle 106 which is completely open at its upper end and provided with a lower opening 108 of reduced size, there is provided a pair of condensing tubes 109 and 110, one fitted concentrically within the other, as shown. The condensing tubes 109 and 110 are each formed of fused quartz or the like and are provided with a downwardly tapering conically-shaped section intermediate their opposite ends which terminates as an elongated depending cylindrical neck-like section of considerably reduced size. The condensing tube 109 is provided with a plurality of rounded end protrusions 111 of uniform size preferably three in number, substantially equally circumferentially spaced from each other, about the conically-shaped portion 112 thereof which protrusions are seated against the inner side walls of the conically-shaped section 113 of the outer condensing tube 110 to support the inner condensing tube 109 in coaxial relation with said outer condensing tube. To assure this aligned relationship of the condensing tubes, other rounded end protrusions 111a are provided either on the inner tube 112 or the outer tube 113 as shown.

The outer condensing tube 110 is, in turn, provided with a conical metallic sleeve 114 of steel or the like fitted about its outer conically-shaped side walls 113 to provide bearing means against which the double condensing tubes 109 and 110 assembly rests in the opening 108 with its depending elongated cylindrical sections extending fully downwardly through said opening 108.

A tubular heating element generally indicated by numeral 115 extends from the muffle 106 downwardly well beyond the full length of the cylindrically-shaped reduced end portions or necks 116 and 117 of the respective condensing tubes 109 and 110 and in close fitting relation with the neck 117 of the tube 110 to provide means for controlling the flow of glass therethrough as will be described in detail hereinafter.

Within the condensing tube 109, there is placed the glass 118 formed as previously described and which is to ultimately form the core part of the fiber 103 and in the space between the condensing tubes 109 and 110, there is placed the glass 119 which is to ultimately form the outer cladding of the fiber 103. The glasses 118 and 119 are formed in separate distillation units, each one of which is identical to the unit 56 of FIG. 2. By means of a transfer tube such as 58 (FIG. 2), the vaporization product of the glass ingredients for the core glass 118 is fed from its respective distillation unit into the condensing tube 109 through an opening 120 in a glass cover 121 and is condensed in the condensing tube 109 to form the molten distilled core glass 118. During the filling of the condensing tube 109, its neck 116 is closed off by a stopper arrangement 122 similar to that shown in FIG. 1. In a similar manner, the vaporization product of the glass ingredients for the cladding glass 119 is fed into the condensing tube 110 through an opening 123 in the glass cover 121 and during the filling of the condensing tube 110, the temperature around the neck 117 thereof is controlled to cause a so-called "freezing" of the glass therein to prevent it from flowing outwardly of the tube 110.

When both tubes are filled to a desired level, such as shown diagrammatically in FIG. 4, a stirring rod 124 is placed in the glass 118 and a second cover 125 is placed over the openings 120 and 123 in the cover 121 to minimize escape of vapor from within the condensing tubes 109 and 110. The stirring rod is supported in a chuck 126 of a motor-driven arrangement similar to that shown in FIG. 1 and rotation of the stirring rod 124 causes homogenization of the glass 118 which is to ultimately become the core part of the fiber 103. It is pointed out that because of the fact that the glass 119 is used as the cladding part of the fiber 103, it is generally not considered necessary to provide for its homogenization in the condensing tube 110.

The terminal ends of the neck-like portions 116 and 117 of the condensing tubes 109 and 110 respectively are reduced to a minimum thickness and precisely controlled as to their related inner diameters so as to produce by the simultaneous flowing of the glasses 118 and 119 therethrough a section of molten glass 127 having inner and outer parts 128 and 129 respectively of the respective glasses 118 and 119 which are of controlled cross-sectional proportions equal to the relative core-to-cladding thicknesses desired of the fiber 103. That is, if, for example, the fiber 103 is to have a cladding of a thickness of 1/10 that of its overall cross-sectional size, the spacing 130 between the ends of the neck portions 116 and 117 of the tubes 109 and 110 would be approximately 1/10 as wide as the inner diameter of the terminal end of the neck portion 117 of the condensing tube 110.

It is pointed out that in drawing a glass fiber such as 103, its resultant relative core-to-cladding thicknesses will always retain substantially the same related proportions as those established at the composite drawing orifices 116 and 117.

The drawing of the fiber 103 is accomplished in substantially the same manner as described above with relation to the drawing of the fiber 13 in FIG. 1. In the apparatus of FIG. 4, however, the fiber-drawing is started by releasing the glasses 118 and 119 simultaneously by the stopper 122 in the condensing tube 109 and controllably raising the temperature around the necks 116 and 117 to allow a substantially uniform flow of the glasses 118 and 119 therethrough. Again, the rate of flow of the glasses and the viscosity of the formation 127 thereof is controlled by the heating element 115. The fiber 103 is initially formed by gripping the combined glasses at 127 with tongs or the like and pulling the same downwardly at a controlled speed to a fiber size desired whereupon it is attached to a mandrel 131 to continue the drawing. The mandrel 131 is of a controlled diameter and rotated at a predetermined uniform rate. The resultant cross-sectional size of the fiber 103 is determined by control of the viscosity of the glasses at 127 and the rate of drawing precisely as described in detail hereinabove with relation to the process illustrated by FIG. 1.

The mandrel 131 is mounted on a rotatable shaft 132 extending through a bearing support 133 and is driven by a motor 134 by means of a belt and pulley connection 135.

The fibers 13 or 103, described hereinabove have unlimited applications of use. For example, a group of such fibers formed of sulphide, selenide or telluride glasses might be bundled together in adjacent side-by-side relation with each other, as shown in FIG. 6. In instances when the fibers are provided with a cladding they may, additionally, be fused together in said relation. The bundle 136 may then be cut transversely to form light-conducting face plates 137 or the like having exceptionally high infra-red transmitting properties such as shown graphically in FIG. 5. Other uses for fibers of the above character might relate to the forming of elongated infra-red transmitting light pipes either of a rigid, semi-rigid or flexible nature.

From the foregoing, it will be seen that efficient and economical means and method have been provided for accomplishing all of the objects and advantages of the invention. Nevertheless, it is apparent that many changes in the details of construction, arrangement of parts or steps in the process may be made without departing from the spirit of the invention as expressed in the accompanying claims and the invention is not to be limited to the exact matters shown and described as only the preferred matters and methods have been given by way of illustration.

Having described my invention, I claim:

1. A glass clad glass light-conducting fiber element predominately transmissive to infra-red radiation comprising a core part formed of a glass having a relatively high index of refraction consisting of approximately 60% arsenic and approximately 40% sulphur and a relatively thin cladding of glass on said core part having a relatively low index of refraction consisting of approximately 50% arsenic and approximately 50% sulphur.

2. A device of the character described comprising a plurality of light-conducting fiber-type elements as set forth in claim 1 grouped in adjacent side-by-side relation with each other.

3. A device comprising a plurality of optical fibers as set forth in claim 1 bundled together in side-by-side relationship.

References Cited by the Examiner

UNITED STATES PATENTS

| | | | |
|---|---|---|---|
| 2,652,660 | 9/53 | Kurz | 49—79 |
| 2,664,671 | 1/54 | Courtney et al. | 18—8 |
| 2,825,260 | 3/58 | O'Brien | 88—1 |
| 2,865,253 | 12/58 | Thielens | 88—57 |
| 2,877,368 | 3/59 | Sheldon. | |
| 2,927,502 | 3/60 | Watrous. | |
| 3,020,806 | 2/62 | Castrucci | 88—1 |
| 3,141,106 | 7/64 | Kapany. | |

OTHER REFERENCES

Frerichs: New Optical Glasses With Good Transparency in the Infrared, Journal of the Optical Society of America, vol. 43, No. 12, December 1953, pages 1153–1157.

Volmer et al.: Light Guide Radiation Pyrometry, Journal of the Optical Society of America, vol. 49, No. 7, January 1959, pages 75–77.

JEWELL H. PEDERSEN, *Primary Examiner.*

EMIL G. ANDERSON, *Examiner.*